United States Patent [19]

Morrill et al.

[11] Patent Number: 4,618,791

[45] Date of Patent: Oct. 21, 1986

[54] ROTOR ASSEMBLY WITH DIE CAST SHAFT EXTENSION COUPLING

[76] Inventors: Giles W. Morrill, Rocky Fork; Stephen G. Rice, Rt. 2, Box 505, both of Erwin, Tenn. 37650

[21] Appl. No.: 788,333

[22] Filed: Oct. 17, 1985

[51] Int. Cl.$^4$ .......................... H02K 3/06; H02K 5/16
[52] U.S. Cl. ...................................... 310/90; 29/598; 310/211; 403/269
[58] Field of Search ...................... 29/598; 310/43, 66, 310/67 R, 40 MM, 90, 211, 212, 261; 384/441; 403/269, 362, 383; 339/441

[56] References Cited

U.S. PATENT DOCUMENTS

| | | | |
|---|---|---|---|
| 2,053,425 | 9/1936 | Else . | |
| 3,253,167 | 5/1966 | Bates et al. | 310/68 |
| 3,601,507 | 8/1971 | Harris | 310/67 |
| 3,814,960 | 6/1974 | Burgbacher . | |
| 3,870,910 | 3/1975 | Füssner | 310/43 |
| 4,056,744 | 11/1977 | Blanchard et al. | 29/598 |
| 4,115,713 | 9/1978 | da Costa et al. | 310/40 MM |
| 4,209,722 | 6/1980 | Peachee, Jr. . | |
| 4,263,711 | 4/1981 | Sakano et al. | 310/43 |
| 4,429,245 | 1/1984 | Müller et al. | 310/261 |
| 4,467,230 | 8/1984 | Rovinsky . | |
| 4,484,094 | 11/1984 | Ade et al. | 310/43 |
| 4,499,661 | 2/1985 | Peachee, Jr. . | |

*Primary Examiner*—Patrick R. Salce
*Assistant Examiner*—D. L. Rebsch
*Attorney, Agent, or Firm*—Pearne, Gordon, Sessions, McCoy, Granger & Tilberry

[57] ABSTRACT

A rotor assembly for an alternating current motor has a stator to cooperate with the rotor assembly. The rotor assembly includes a magnetically permeable rotor mass of a stack of rotor laminations which are mounted on a hub, and the hub is secured to a shaft which rotates in a stationary bearing fixed to the motor frame. The rotor mass includes apertures which extend longitudinally and die cast squirrel cage conductor bars extend through these apertures. Integral with the rotor assembly is a die cast extension on the rotor mass coaxially on one end thereof. This coaxial die cast extension surrounds one end of the shaft and is adapted to be connected directly to a load to transmit torque directly from the conductor bars of the squirrel cage winding from the load without the necessity of the torque passing through the shaft. The die cast extension may also have a non-circular configuration for readily transmitting torque to the load. The foregoing abstract is merely a resume of one general application, is not a complete discussion of all principles of operation or applications, and is not to be construed as a limitation on the scope of the claimed subject matter.

18 Claims, 9 Drawing Figures

ROTOR ASSEMBLY WITH DIE CAST SHAFT EXTENSION COUPLING

BACKGROUND OF THE INVENTION

This invention relates to electric motor construction, and more particularly to subfractional horsepower alternating current motors. Many such small motors are constructed with two bearings in the frame or stator for journaling the rotor shaft near each end thereof.

The present invention is primarily concerned with a single or unit bearing motor wherein there is only one fixed bearing which journals a single journal portion on the rotor shaft. Motors of this type are shown in U.S. Pat. Nos. 2,053,425; 4,209,722; and 4,499,661. Different methods have been suggested in these patents for driving a load from the rotor. The torque is developed in the rotor conductors, transferred to the rotor mass, from there to the shaft, and then to the load. One typical example is to grind or mill a flat on the steel shaft so that the shaft will have a non-circular configuration, and hence transmit torque to a load connected to the shaft at the area having the flat. This is shown in U.S. Pat. No. 2,053,425.

Another means to transmit torque to a load is by utilizing a threaded end on the shaft to receive a nut for securing the load onto the rotor shaft. All of these prior methods require extra machining on the shaft in order to obtain a non-circular cross section for transfer of torque to the load. Usually, the load has to have a cross section of hub aperture the same diameter as the motor shaft.

SUMMARY OF THE INVENTION

The problem to be solved, therefore, is how to manufacture a small electric motor in a manner to minimize the labor component and at the same time to create a rotor assembly which has an end of a shaft or other rotatable component which may be readily manufactured at a desired diameter different from the shaft diameter to enable torque to be transmitted directly to a load.

This problem is solved by a rotor assembly for an alternating current motor having a stator, said rotor assembly comprising a magnetically permeable rotor mass having apertures and a rotational axis, a die cast squirrel cage extending through said apertures in said rotor mass, an integral die cast extension on said rotor mass coaxially on one end thereof, a journal portion on said rotor assembly for journaling said rotor assembly relative to a stationary bearing, and said integral die cast extension adapted to be connected to a load to transmit torque thereto.

Accordingly, an object of the invention is to provide an alternating current motor with a die cast extension surrounding the shaft, which extension has a non-circular cross section for torque transfer to a load.

Another object of the invention is to provide a squirrel cage motor with a die cast extension integral with the squirrel cage and which has a non-circular configuration to transmit torque to a load.

Other objects and a fuller understanding of the invention may be had by referring to the following description and claims, taken in conjunction with the accompanying drawing.

DESCRIPTION OF THE PREFERRED EMBODIMENTS

Figure 1:
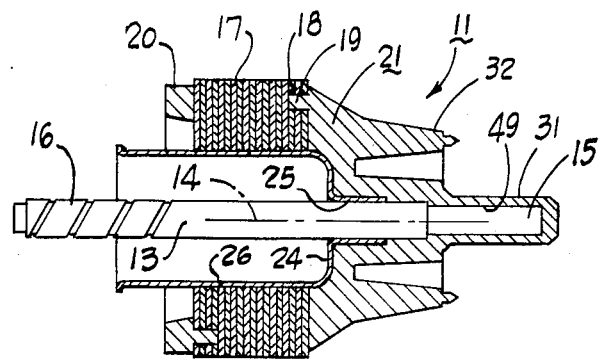
FIG. 1 is a longitudinal, sectional view of a rotor assembly incorporating the invention.

FIGS. 1, 2, 3, and 4 illustrate a rotor assembly 11 constructed in accordance with the invention. This rotor assembly is for an alternating current motor 12 shown in FIG. 4, and has special advantages with a subfractional horsepower motor utilizing a squirrel cage winding. This is usually in an induction motor, or at least one with induction starting. The rotor assembly 11 is mounted on a shaft 13 having an axis 14 and first and second ends 15 and 16. The rotor assembly also includes a magnetically permeable rotor mass and, in this embodiment, this is conveniently provided by a stack of rotor laminations 17. This stack of laminations has generally longitudinally extending apertures 18, which typically are skewed to minimize cogging in the motor speed characteristics. The rotor assembly further includes a die cast squirrel cage in the rotor mass which includes conductor bars 19 in the longitudinal apertures 18 and end rings 20 integral therewith to form a squirrel cage winding 21. The rotor assembly 11 in this embodiment is mounted on the shaft 13, and this includes a metal hub 24 which has a small diameter portion 25 and a large diameter portion 26. The small diameter portion 25 is secured to the shaft 13, e.g., by a press fit and/or by welding, and the lamination stack is pressed onto the large diameter portion 26. The rotor assembly has a journal portion to journal it relative to a stationary bearing in the motor frame 28, and this journal portion in this embodiment is provided on the second end 16 of the shaft 13. This second end journal portion 16 is mounted in the stationary bearing 29 secured to the motor frame 28. This is shown in the motor assembly of FIG. 4.

Figure 2:
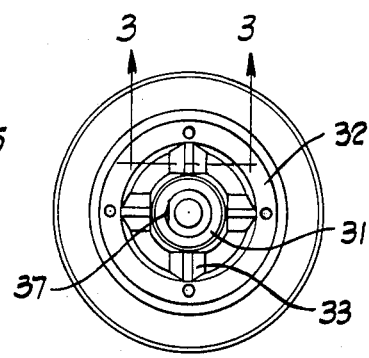
FIG. 2 is an end view of the rotor assembly of FIG. 1.
Figure 3:
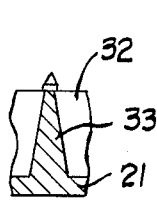
FIG. 3 is a partial view on line 3—3 of FIG. 2.
Figure 4:
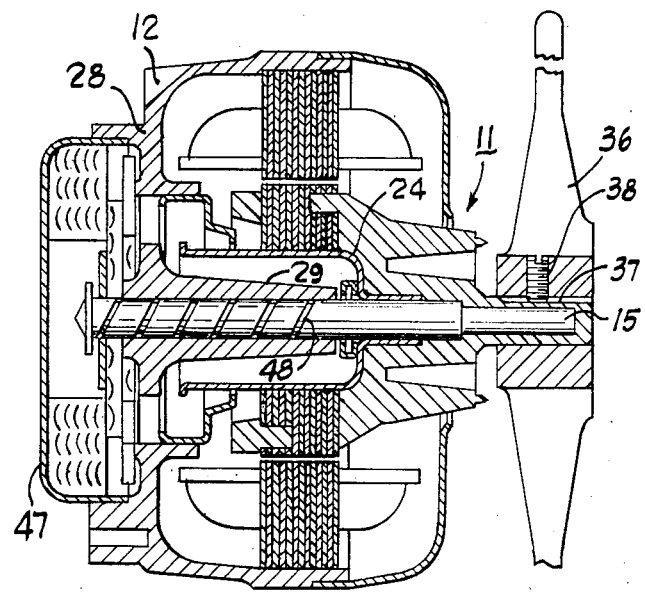
FIG. 4 is a longitudinal, sectional view of a complete motor incorporating the rotor assembly of the invention.

The squirrel cage winding 21 in this embodiment is die cast, and there is a die cast extension 31 which is coaxial on one end of the rotor assembly 11. This die casting may typically be of aluminum or an alloy. As shown in FIG. 1, this die cast extension is not only integral with the rotor, but it is unitary with the squirrel cage winding 21 and constitutes a die cast extension which closely engages the first end 15 of the shaft 13. It is formed of a first sleeve integral with the squirrel cage winding to surround and enclose this first end 15, which is a reduced diameter portion for the practical purpose of permitting the die casting to have sufficient wall thickness for proper metal flow during the die casting process. In this preferred embodiment, the die cast extension completely encloses the first end 15 of the shaft 13. The die cast squirrel cage winding 21 has a second sleeve 32 which is larger in diameter than the first sleeve die cast extension 31, and hence is coaxial with this extension 31 and is integrally joined thereto by a plurality of radial ribs 33. These unitary radial ribs stiffen the entire squirrel cage winding 21 and the rotor assembly 11. The second sleeve 32 is shorter axially than the first sleeve die cast extension 31, and this permits the die cast extension to be connected directly to a load, such as a fan blade 36. In the preferred embodiment, the die cast extension 31 is non-circular in cross section and FIG. 2 shows this extension to have a flat 37 thereon to permit transfer of torque from the rotor assembly 11 to the load or fan blade 36. It will be observed that the torque in an induction start motor is developed directly in the conductor bars 19 of the squirrel cage winding 21. By having the torque transmitted directly from this unitary die cast extension 31 of the squirrel cage winding 21, the torque is transmitted directly from the conductor bars 19 to the fan blade, and hence does not need to be transferred first to the rotor laminations, next to the shaft, and then to the load. The only torque transfer from the squirrel cage winding to the shaft is just enough to overcome the friction between the shaft journal portion 16 and the stationary bearing 29.

Figure 5:
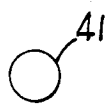
FIGS. 5–9 are end views of various modifications of the die cast extension.

FIG. 5 shows an alternative embodiment wherein the die cast extension 41 is cast over the non-reduced diameter end of the shaft 13, or over the reduced diameter portion 15, and is circular in cross section. In this case, the setscrew 38 of the fan blade load may be screwed, not onto the flat 37, but into the aluminum metal of the die casting. This setscrew will penetrate into this relatively softer metal with ease, to secure the fan blade load to this die cast extension 41. The advantage of the embodiment of FIG. 5 is that the die cast extension 41 may be made in larger diameter than the shaft 13 to accommodate a hub of a load which has a larger bored aperture, and hence the motor construction need not be changed to utilize a shaft of larger diameter throughout its length. Typically, this shaft is of steel, so the embodiment of FIG. 5 is a saving of material in the manufacture of the motor.

Figure 6:
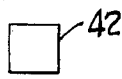

The embodiment of FIG. 6 shows a die cast extension 42 which is square in cross section. This will readily mate with a complementary aperture in a load to transfer torque to such load. Such die cast extension 42 may readily be cast as a unitary part of the squirrel cage winding 21 over either a reduced or non-reduced portion of the shaft. Such reduced portion of the shaft is circular in cross section and coaxial with the axis, so that simple machining will achieve this reduced diameter portion.

Figure 7:
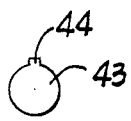

FIG. 7 shows a die cast extension 43 which is formed preferably on a reduced diameter portion of the shaft, and which has a unitary key 44 to be received in a keyway in the load. Again, this is a non-circular cross section for transfer of torque to the load.

Figure 8:
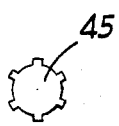

FIG. 8 shows a die cast extension 45 with unitary splines of the die cast aluminum material. Again, these splines are adapted to be received in a complementary aperture in the load to transfer torque thereto.

Figure 9:
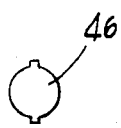

FIG. 9 shows another embodiment of the die cast extension 46 which has double keys to be received in a load having a double keyway.

Another advantage of the invention is the ease of forming any of the various modifications of FIGS. 2 and 5-9. The die casting die for the squirrel cage winding 21 may be provided with a removable coaxial insert to create the die cast extension 31 or 41-46 of any practicable diameter and cross-sectional shape. This permits a load with an oversize bored hole to be driven from the motor without redesigning the motor to have a larger diameter shaft.

The various embodiments of the invention provide a rotor assembly wherein the torque is developed directly in the squirrel cage winding 21 and is transferred directly by this squirrel cage winding to the load, shown as the fan blade 36. The torque is not transferred first to the rotor laminations, next to the shaft and then to the load, and hence this precludes the necessity for a good physical bond between the squirrel cage winding 21 and the shaft 13.

It has been observed that where electric motors have been used to drive a fan in refrigeration equipment, a very long life is required. To this end, a lubricant reservoir 47 is provided and an oil groove 48 is provided as a helix in the journal portion 16 of the shaft 13. This moves oil from the oil reservoir 47 along the shaft throughout the length of the stationary bearing 29. The hub 24 is of metal, such as steel, and is preferably welded to the shaft 13 for a positive oil seal. The portion 49 of the squirrel cage die cast extension 31 which directly engages the shaft may slightly leak some oil after years of use, which could deplete the oil in the oil reservoir 47. This shows that there is not a perfectly tight engagement between the die cast extension 31 and the shaft 13 in all cases. Since this engagement at the portion 49 may break loose enough to form an oil leakage crack, this shows another advantage of the present invention. This is that the engagement between the shaft and the squirrel cage winding is not required to transmit any torque; accordingly, there is less tendency for such a crack to develop.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A rotor assembly for an alternating current motor having a stator, said rotor assembly comprising:
    a magnetically permeable rotor mass having apertures and a rotational axis;
    a die cast squirrel cage extending through said apertures in said rotor mass;
    an integral die cast extension on said rotor mass coaxially on one end thereof;
    a journal portion on said rotor assembly for journaling said rotor assembly relative to a stationary bearing; and
    said integral die cast extension adapted to be connected to a load to transmit torque thereto.

2. A rotor assembly as set forth in claim 1, wherein said integral die cast extension has a noncircular cross section.

3. A rotor assembly as set forth in claim 1, including a shaft in said rotor assembly, and said integral extension surrounding the periphery of one end of said shaft.

4. A rotor assembly as set forth in claim 3, wherein said integral extension closely engages said shaft.

5. A rotor assembly as set forth in claim 3, wherein said integral extension encloses said one end of said shaft.

6. A rotor assembly as set forth in claim 3, wherein said one end of said shaft is a reduced diameter portion extending substantially to the end of said die cast extension.

7. A rotor assembly as set forth in claim 3, wherein said one end of said shaft is a reduced diameter portion circular in cross section.

8. A rotor assembly as set forth in claim 1, wherein said rotor assembly includes a substantially cylindrical sleeve as said die cast extension.

9. A rotor assembly as set forth in claim 8, wherein said rotor assembly includes a second substantially cylindrical sleeve surrounding the first-mentioned sleeve and unitarily joined thereto by substantially radial ribs for added rigidity of the rotor assembly.

10. A rotor assembly as set forth in claim 9, wherein said first-mentioned substantially cylindrical sleeve is longer than said second sleeve.

11. A rotor assembly as set forth in claim 2, wherein said die cast extension has a flat to form the non-circular cross section.

12. A rotor assembly as set forth in claim 2, wherein said die cast extension has a splined surface.

13. A rotor assembly as set forth in claim 2, wherein said die cast extension has a keyed configuration.

14. A rotor assembly as set forth in claim 2, wherein said die cast extension has a square cross section.

15. A rotor assembly as set forth in claim 2, wherein said die cast extension has a circular cross section.

16. A rotor assembly as set forth in claim 1, including a shaft in said rotor assembly with said journal portion thereon.

17. A rotor assembly as set forth in claim 1, including a hub in said rotor assembly with said rotor mass mounted thereon.

18. A rotor assembly as set forth in claim 1, wherein said integral die cast extension is unitary with said squirrel cage winding.

* * * * *